(12) United States Patent
Lee

(10) Patent No.: US 8,187,553 B2
(45) Date of Patent: May 29, 2012

(54) MICROREACTORS

(75) Inventor: Seh Kwang Lee, Yongin-si (KR)

(73) Assignee: Empire Technology Development LLC, Wilmington, DE (US)

( * ) Notice: Subject to any disclaimer, the term of this patent is extended or adjusted under 35 U.S.C. 154(b) by 121 days.

(21) Appl. No.: 12/766,349

(22) Filed: Apr. 23, 2010

(65) Prior Publication Data

US 2011/0259834 A1 Oct. 27, 2011

(51) Int. Cl.
*B01J 8/02* (2006.01)
*B01J 35/02* (2006.01)
*B01J 19/00* (2006.01)
*B01J 8/08* (2006.01)
*B01J 8/00* (2006.01)

(52) U.S. Cl. ........ 422/211; 422/129; 422/130; 422/187; 422/213; 422/600; 422/603

(58) Field of Classification Search .................. 422/129, 422/131, 211, 600, 603, 213, 130, 187; 210/749
See application file for complete search history.

(56) References Cited

U.S. PATENT DOCUMENTS

| 3,691,735 | A | 9/1972 | Knierim |
| 3,794,299 | A | 2/1974 | Wagner et al. |
| 5,543,016 | A | 8/1996 | Fehlner et al. |
| 6,569,323 | B1 * | 5/2003 | Pribytkov ..................... 210/181 |
| 7,541,007 | B2 | 6/2009 | Pattekar et al. |
| 7,905,946 | B1 * | 3/2011 | Weislogel et al. .............. 95/272 |
| 2005/0272144 | A1 | 12/2005 | Sando et al. |
| 2008/0128331 | A1 * | 6/2008 | Lean et al. .................... 209/155 |
| 2008/0274038 | A1 | 11/2008 | Sakata et al. |
| 2010/0072116 | A1 * | 3/2010 | Tabata et al. .................. 209/646 |

FOREIGN PATENT DOCUMENTS

| JP | 2003-164745 | 6/2003 |
| JP | 2004-195433 | 7/2004 |
| JP | 2007-268491 | 10/2007 |
| JP | 2007-275689 | 10/2007 |

OTHER PUBLICATIONS

Sudarsan et al., Fluid mixing in planar spiral microchannels, 2006, Lab Chip, The Royal Society of Chemistry, 6, 74-82.*
Vimal Kumar, et al "Slug flow in curved microreators: Hydrodynamic study" Chemical Engineering Science, vol. 62, 2007, pp. 7494-7504.
International Search Report and Written Opinion from International Application No. PCT/US2010/060692 dated Feb. 3, 2011.

* cited by examiner

*Primary Examiner* — Walter D Griffin
*Assistant Examiner* — Natasha Young
(74) *Attorney, Agent, or Firm* — Workman Nydegger

(57) ABSTRACT

A microreactor may include a reaction channel having at least one curved microchannel, the at least one curved microchannel having an outer and inner curved surfaces and being configured to generate a centrifugal force, an inlet configured to supply at least one reactant into the reaction channel, and an outlet bifurcated into a first sub-outlet in communication with the inner curved surface of the at least one curved microchannel and a second sub-outlet in communication with the outer curved surface of the at least one curved microchannel.

20 Claims, 9 Drawing Sheets

MICROREACTORS

BACKGROUND

Microsystems are miniature devices which perform non-electronic functions, e.g., sensing and actuation. Microsystems include microreactors to facilitate chemical and/or biochemical reactions, and one or more units to perform separation and/or analysis operations. Microreactors include a confinement with typical lateral dimensions below 1 mm to facilitate the chemical and/or biochemical reactions, and the most typical form of such confinement are microchannels. Microreactors provide easier process control of the chemical and/or biochemical reactions and reduce the risks of unwanted side reaction. Accordingly, there is an interest to apply such microreactors to various type of chemical and/or biochemical reactions.

DETAILED DESCRIPTION

Figure 1A:
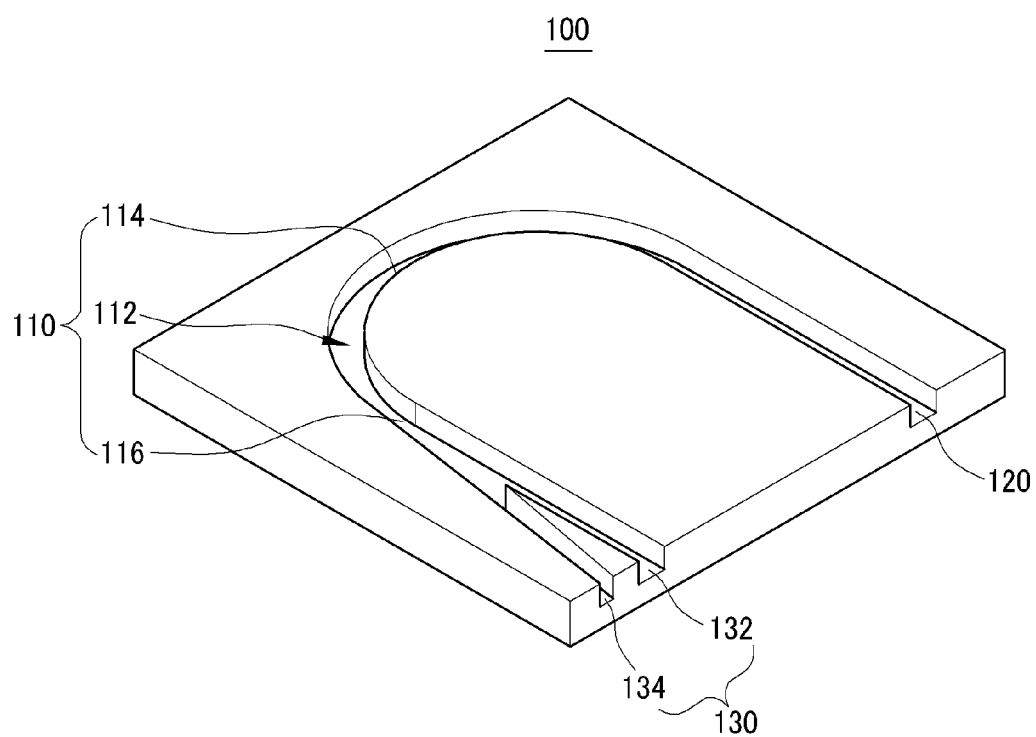
FIG. 1A is a schematic diagram showing an illustrative embodiment of a microreactor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

As used herein, the term "phase" refers to a physically distinctive form of a material. For example, a phase of a material may include any of known states of a material, such as a gas phase, a liquid phase, and a solid phase. Further, a phase of a material may include any mixed states such as a gas-liquid mixed phase, a gas-solid mixed phase, a liquid-solid mixed phase, and a gas-liquid-solid mixed phase. A material in a gas phase has a less density than a material in a liquid phase, and a material in a liquid phase has a less density than a material in a solid phase. For the purpose of description, therefore, it will be referred to hereinafter that a material in a gas phase is a lighter phase material with respect to a material in a liquid or solid phase, and a material in a liquid phase or gas-liquid mixed phase is a lighter phase material with respect to a material in a solid phase. Further, it will be referred to hereinafter that a material in a solid phase is a heavier phase material with respect to a material in a gas phase, a liquid phase or a gas-liquid mixed phase, and a material in a liquid phase is a heavier phase material with respect to a material in a gas phase.

As used herein, the term "product" refers to a material that is formed during a reaction. See e.g., the *International Union of Pure and Applied Chemistry (IUPAC) Compendium of Chemical Terminology*, $2^{nd}$ ed. (1997), which is incorporated herein by reference in its entirety. As used herein, the term "reactant(s)" refers to an original material that enters into a microreactor. As used herein, the term "reaction" refers to a process in which one or more materials are transformed into another material or materials. As used herein, the terms "react," "reacted" and "reacting" mean undergoing a reaction, as defined herein.

At least one reactant may produce one or more products through the chemical or biochemical reactions. Reactions can be roughly categorized into combination, decomposition, substitution, and double decomposition. By way of example, in combination reaction, two or more reactants can be combined to produce a single product. In decomposition reaction, one reactant can be separated into two or more products. Further, in substitution and double decomposition reactions, constituent elements in two or more reactants can be interchanged so as to produce two or more products.

In one embodiment, a microreactor includes a reaction channel having at least one curved microchannel, the at least one curved microchannel having an outer and inner curved surfaces and being configured to generate a centrifugal force; an inlet configured to supply at least one reactant into the reaction channel; and an outlet bifurcated into a first sub-outlet in communication with the inner curved surface of the at least one curved microchannel and a second sub-outlet in communication with the outer curved surface of the at least one curved microchannel.

In some embodiments, the inlet may be connected to one end of the reaction channel, and the outlet may be connected to the other end of the reaction channel. The inlet can be formed in one path or passage, whereas the outlet can be formed to be branched into two sub-outlets, i.e., the first sub-outlet and the second sub-outlet. The first sub-outlet can be extended from the inner curved surface of the at least one curved microchannel, whereas the second sub-outlet can be extended from the outer curved surface of the at least one curved microchannel. Accordingly, the first sub-outlet can be positioned closer to the center of the at least one curved microchannel than the second sub-outlet.

Since the reaction channel includes the at least one curved microchannel, a centrifugal force can be generated by a curvature of the at least one curved microchannel. The generated centrifugal force may be applied to a material, such as a reactant or a product, flowing through the curved microchannel, and the material may move away from the center of the curvature of the curved microchannel.

The centrifugal force F in the curved microchannel can be represented by an equation of $F=mv^2/r$, in which m is a mass (or a density) of the material flowing in the curved microchannel and r is a radius of the curvature in the curved microchannel. Accordingly, the centrifugal force applied to a material flowing through the curved microchannel is proportional to a mass or density of the material. Therefore, a lighter phase material having a less density tends to flow along an inner curved surface in the curved microchannel whereas a heavier phase material having a more density tends to flow along an outer curved surface in the curved microchannel.

In some embodiments, each of the at least one curved microchannel may have a width or a depth in a range of submillimeters to millimeters. For example, the depth or width value is no greater than about 3 mm; about 1 mm; about 0.5 mm; or about 0.1 mm. The length of the at least one curved microchannel can be of any dimension. In some embodiments, the length of the microchannels may be in the order of inches. For example, the length of the microchannels is no more than about 6 inches; about 3 inches; about 1 inch or about 0.5 inch.

In some embodiments, the lengthwise dimensions of the at least one curved microchannel may be various or constant. For example, the at least one curved microchannel is configured to form a 3-dimensional helical reaction channel or a cyclone-type reaction channel.

In some embodiments, a part of the at least one curved microchannel of the reaction channel may have a substantially semicircular or semioval shape. The cross section of the at least one curved microchannel can be any shape, for example, but not limited thereto, rectangular, square, trapezoidal, triangular, circular, or semi-circular.

In some embodiments, a product or a byproduct may be formed by the at least one reactant or by a reaction between two or more of the reactants flowing through the at least one curved microchannel in the reaction channel. The byproduct may include any type of side products and/or wastes generated from the reaction. In some embodiments, the at least one reactant, the product and the byproduct may have different phases from each other. By way of example, the materials (e.g., reactant, product and/or byproduct) flowing in the reaction channel may form multiple phases, such as gas-liquid mixed phase, a gas-solid mixed phase, a liquid-solid mixed phase and a gas-liquid-solid mixed phase.

When the materials having at least two different phases flow through the at least one curved microchannel, each of the materials may be differently subject to the centrifugal forces generated in the at least one curved microchannel, depending on the phases of each material. As described above, the centrifugal force is proportional to a mass or density of each of the materials flowing through the at least one curved microchannel. Therefore, among the materials, i.e., the at least one reactant, the product and the byproduct, a material having a lighter phase tends to flow along the inner curved surface in the curved microchannel due to the relatively smaller centrifugal force applied thereto, and, thus, the material can be collected through the first sub-outlet extended from the inner curved surface. On the contrary, a material having a heavier phase material tends to flow along an outer curved surface in the curved microchannel due to the relatively greater centrifugal force applied thereto, and, thus, the material can be collected through the second sub-outlet extended from the outer curved surface. Accordingly, the at least one reactant, the product and the byproduct may flow in different paths in the at least one curved microchannel of the reaction channel, and thus they can be separately collected from the first sub-outlet and the second sub-outlet according to the phase of each thereof. As a result, the materials having multiple physical phases can be easily and efficiently separated from each other according to the phase of each thereof by using the microreactor.

In one embodiment, the microreactor may be used for performing various types of reactions such as chemical and/or biochemical reactions. In some embodiments, the microreactor may be used for performing a reaction in which a product and/or a byproduct have a different phase with respect to a reactant.

In one embodiment, the at least one reactant flowing in a microreactor may be any material to generate a product and/or a byproduct during a reaction in the microreactor. By way of example, the at least one reactant may be any material having any one of a gas phase, a liquid phase and a gas-liquid mixed phase. A product that is generated from the at least one reactant flowing through the at least one curved microchannel during a reaction may have any one of a gas phase, a liquid phase, a gas-liquid mixed phase, a liquid-solid mixed phase and a solid phase. A byproduct that is optionally generated from the at least one reactant may have any one of a liquid phase, a liquid-solid mixed phase and a solid phase.

In one embodiment, the microreactor may be fabricated by using any of a variety of well-known micromachining techniques, such as patterning, photolithography and etching. By way of example, a microreactor may be fabricated by performing a micromachining process on a substrate, such as a metal, silicon, Teflon (registered tradename), glass, a ceramic, a plastic, a polymer, and the like. By way of example, the LIGA (Lithographic Galvanoforming Abforming) technique using X-ray lithography, high-aspect-ratio photolithography using EPON SU-8 (tradename), micro-electro-discharge machining (.mu.EDM), high-aspect-ratio machining of silicon by deep reactive ion etching (RIE), hot embossing, stereolithography, laser machining, ion beam machining, and mechanical micro-cutting using micro-tools made of hard materials such as diamond, may be used as the micromachining techniques. Any of these techniques can either be used by itself or in a combination of two or more. For detail descriptions on the micromachining techniques, please see the methods described in, for example, "Microreactors, Epoch-making Technology for Synthesis" (edited by Jun-ichi Yoshida and published by CMC Publishing Co., Ltd., 2003) and "Fine Processing Technology, Application Volume—Application to Photonics, Electronics and Mechatronics—" (edited by the Meeting Committee of the Society of Polymer Science, Japan, and published by NTS Inc., 2003), which are incorporated herein by references in their entireties.

In another embodiment, a microreactor may include a substantially circular reaction microchannel having an outer and inner curved surfaces and being configured to generate a centrifugal force. The microreactor may further include an inlet configured to supply at least one solid catalyst particle and at least one reactant into the substantially circular reaction microchannel and an outlet in communication with the inner curved surface of the substantially circular reaction microchannel. The at least one reactant may have any one of a gas phase, a liquid phase and a gas-liquid mixed phase.

Since the microreactor includes a substantially circular reaction microchannel, a centrifugal force may be generated by a curvature of the substantially circular reaction microchannel. Therefore, a centrifugal force may be applied to the at least one solid catalyst particle and the at least one reactant flowing through the substantially circular reaction microchannel. The at least one reactant flowing through the substantially circular reaction microchannel may be subject to a catalytic reaction in the microreactor to form a material including a product.

In some embodiments, the microreactor can be used to perform any catalytic reaction using at least one solid catalyst particle. In some embodiments, the microreactor may be used to perform a catalytic reaction using at least one solid catalyst particle and at least one reactant. The catalytic reaction between the solid catalyst particle and the at least one reactant having any one of a gas phase, a liquid phase and a gas-liquid mixed phase, may form a product that has any one of a gas phase, a liquid phase and a gas-liquid mixed phase. As described above, a centrifugal force may be applied differently to a material flowing in the circular reaction microchannel. Thus, the catalyst particle and the product formed by the catalytic reaction may be subject to a different centrifugal force. For example, the at least one solid catalyst particle, flowing through the substantially circular reaction microchannel, may be subject to a greater centrifugal force, compared with the at least one reactant and the product, both of which have any one of a gas phase, a liquid phase and a gas-liquid mixed phase, respectively. Accordingly, the at least one catalyst solid particle flows along an outer circular surface in the substantially circular reaction microchannel because the at least one catalyst solid particle is subjected to a relatively greater centrifugal force, and, thus, it is forced to go away from the center of the reaction microchannel where the centrifugal force is generated. On the contrary, the at least one reactant and the product flow along an inner circular surface in the substantially circular reaction microchannel because the at least one reactant and the product are subject to a relatively smaller centrifugal force, and, thus, they flow in the inner curved surface of the reaction microchannel. Thus, the at least one reactant and the material, including the product having any of a gas phase, a liquid phase and a gas-liquid mixed phase, may be collected from the outlet in communication with the inner curved surface whereas the at least one catalyst solid particle may remain in the substantially circular reaction microchannel.

In some embodiments, the substantially circular reaction microchannel is configured to circulate the at least one solid catalyst particle along the outer curved surface thereof. Therefore, the at least one catalyst solid particle remaining in the microreactor may be continuously used for the catalytic reaction as long as at least one reactant is continuously supplied into the microreactor.

In some embodiments, the inlet may be tangentially connected to the outer curved surface of the substantially circular reaction microchannel. The outlet may be protruded from the inner curved surface of the substantially circular reaction microchannel. By way of example, the outlet may be protruded from the inner curved surface of the substantially circular reaction microchannel at a position distanced away from the inlet toward the center of the substantially circular reaction microchannel, so that the at least one reactant can be substantially transformed into a product by contact with the at least one solid catalyst particle in the microchannel. As the outlet is distanced away from the inlet, the at least one reactant can be circulated along the substantially circular reaction microchannel for enough time to allow the at least one reactant to sufficiently contact the at least one solid catalyst particle.

To be specific, the inlet may be connected to the substantially circular reaction microchannel at a connection point and the outlet may be branched from the substantially circular reaction microchannel at a branch point. By way of example, an angle between the connection point and the branch point along the substantially circular reaction microchannel is about 250 degree. For example, but not limited thereto, the angle between the connection point and the branch point along the substantially circular reaction microchannel may be from about 250 degree to about 360 degree, from about 260 degree to about 360 degree, from about 270 degree to about 360 degree, from about 280 degree to about 360 degree, from about 290 degree to about 360 degree, from about 300 degree to about 360 degree, from about 310 degree to about 360 degree, from about 320 degree to about 360 degree, from about 330 degree to about 360 degree, from about 340 degree to about 360 degree, from about 350 degree to about 360 degree, from about 250 degree to about 260 degree, from about 250 degree to about 270 degree, from about 250 degree to about 280 degree, from about 250 degree to about 290 degree, from about 250 degree to about 300 degree, from about 250 degree to about 310 degree, from about 250 degree to about 320 degree, from about 250 degree to about 330 degree, from about 250 degree to about 340 degree, or from about 250 degree to about 350 degree. For example, but not limited thereto, the angle between the connection point and the branch point along the substantially circular reaction microchannel may be about 250 degree, about 260 degree, about 270 degree, about 280 degree, about 290 degree, about 300 degree, about 310 degree, about 320 degree, about 330 degree, about 340 degree, or about 350 degree.

In some embodiments, the microreactor may further include a filtering device configured to prevent the at least one solid catalyst particle from flowing into the outlet. By way of example, but not limited thereto, the filtering device may include a meshed filter or a baffle. For example, the meshed filter may be fabricated using a metal or a glass. The meshed filter may have a mesh size at least smaller than a particle size of the at least one solid catalyst particle so as prevent the at least one solid catalyst particle from flowing out through the outlet.

In some embodiments, the substantially circular reaction microchannel may have a width or a depth in a range of submillimeters to millimeters. By way of example, the depth or width value is no greater than about 3 mm; about 1 mm; about 0.5 mm; or about 0.1 mm. The length of the substantially circular reaction microchannel can be of any dimension. In some embodiments, the length of the substantially circular reaction microchannel may be in the order of inches. By way of example, the length of the substantially circular reaction microchannel is no more than about 6 inches; about 3 inches; about 1 inch or about 0.5 inch. In some embodiments, the lengthwise dimension of the substantially circular reaction microchannel may vary or may be constant. In some embodiments, the cross section of the substantially circular reaction microchannel can be any shape, for example, but not limited thereto, rectangular, square, trapezoidal, triangular, circular, or semi-circular.

In still another embodiment, a reaction method may include: flowing at least one reactant through a microreactor having a curved microchannel; transforming the at least one reactant into at least one product in the curved microchannel; and causing the at least one product to flow along either an inner curved surface of the curved microchannel or an outer curved surface of the curved microchannel, according to a physical phase of the at least one product.

In some embodiment, the at least one product has a first product in a lighter phase and a second product in a heavier phase. Further, causing the at least one product to flow along either an inner curved surface of the curved microchannel or an outer curved surface of the curved microchannel, according to a physical phase of the at least one product, may include: generating a centrifugal force in the curved microchannel; and causing the first product to flow along the inner curved surface of the curved microchannel and the second product to flow along the outer curved surface of the curved microchannel.

In some embodiment, the reaction method may further include: collecting the first and second products separately, by using first and second outlets in communication with the inner and outer curved surfaces of the curved microchannel, respectively.

In some embodiment, flowing at least one reactant through a microreactor may include: flowing at least one solid catalyst particle in the curved microchannel to cause a catalytic reaction between the at least one solid catalyst particle and the at least one reactant.

In some embodiments, each of the at least one reactant and the at least one product may have any one of a gas phase, a liquid phase and a gas-liquid mixed. In addition, causing the at least one product to flow along either an inner curved surface of the curved microchannel or an outer curved surface of the curved microchannel, according to a physical phase of the at least one product, may include: generating a centrifugal force in the curved microchannel; and causing the at least one product to flow along the inner curved surface of the curved microchannel and further causing the at least one solid catalyst particle to flow along the outer curved surface of the curved microchannel.

In some embodiments, the reaction method may further include: collecting the at least one product from an outlet in communication with the inner curved surface of the curved microchannel. The reaction method may further include: circulating the at least one solid particle through the curved microchannel.

The microreactor may be used for performing various types of reactions such as chemical and/or biochemical reactions. By way of example, the microreactor may be used for performing a reaction in which a product and/or a byproduct generated from the reactions have a different phase with respect to a reactant.

The at least one reactant may be any material to generate at least one product, i.e., a first product and/or a second product (e.g., a byproduct). Such products may have a different phase from that thereof during a reaction thereof in the microreactor. By way of example, the at least one reactant may be any material having any one of a gas phase, a liquid phase and a gas-liquid mixed phase, a product generated from the at least one reactant flowing through the at least one curved microchannel during a reaction may have any one of a gas phase, a liquid phase, a gas-liquid mixed phase, a liquid-solid mixed phase and a solid phase, and optionally a byproduct generated from the at least one reactant may have any one of a liquid phase, a liquid-solid mixed phase and a solid phase.

For example, but not limited thereto, the at least one reactant having any one of a gas phase, a liquid phase and a gas-liquid mixed phase flows through the at least one curved microchannel during a reaction to form a product and optionally a byproduct having a solid phase. In this case, the at least one reactant, which has a lighter phase with respect to the product and optionally the byproduct, tends to flow along the inner curved surface in the at least one curved microchannel whereas the product and optionally the byproduct tends to flow along the outer curved surface in the at least one curved microchannel. As a result, the at least one reactant can be collected from the first sub-outlet in communication with the inner curved surface, and the product and optionally the byproduct can be collected from the second sub-outlet in communication with the outer curved surface. Accordingly, the at least one reactant may be easily and efficiently separated from the product and optionally the byproduct using the microreactor for the reaction.

For example, but not limited thereto, the at least one reactant and a product may have any one of a gas phase, a liquid phase and a gas-liquid mixed phase, and a byproduct may have a solid phase. In this case, the at least one reactant having and the product can be collected from the first sub-outlet, and the byproduct can be collected from the second sub-outlet. Accordingly, the byproduct may be easily and efficiently separated from the at least one reactant and the product using the microreactor.

For example, but not limited thereto, the at least one reactant may have a gas phase, a product and optionally a byproduct may have any one of a liquid phase, a solid phase and a liquid-solid mixed phase. In this case, the at least one reactant can be collected from the first sub-outlet, and the product and optionally the byproduct can be collected from the second sub-outlet. Accordingly, the at least one reactant may be easily and efficiently separated from the product and optionally the byproduct using the microreactor for the reaction.

For example, but not limited thereto, the at least one reactant and a product may have any one of a gas phase, a byproduct may have any one of a liquid phase, a solid phase and a liquid-solid mixed phase. In this case, the at least one reactant and the product can be collected from the first sub-outlet, and the byproduct can be collected from the second sub-outlet. Accordingly, the at least one reactant and the product may be easily and efficiently separated from the byproduct using the microreactor for the reaction.

In some embodiments, the reaction method may further include flowing at least one catalyst solid particle through the microreactor.

Hereafter, with reference to the drawings, a more detailed description will be given of the microreactor in accordance with the invention.

Figure 1B:
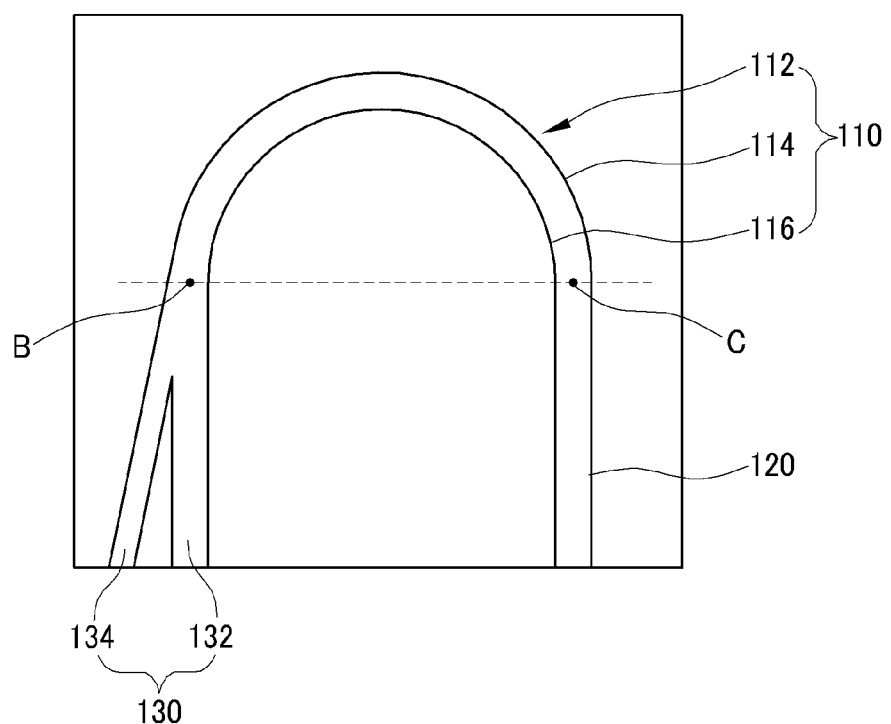
FIG. 1B is a plane view of the microreactor in FIG. 1A.

FIG. 1A is a schematic diagram showing an illustrative embodiment of a microreactor and FIG. 1B is a plane view of the microreactor in FIG. 1A. FIGS. 1A and 1B illustrate that a microreactor 100 includes a reaction channel 110, an inlet 120, and a bifurcated outlet 130. Reaction channel 110 includes a curved microchannel 112, an outer curved surface 114 and an inner curved surface 116. Outlet 130 is bifurcated into a first sub-outlet 132 and a second sub-outlet 134.

Referring to FIG. 1B, inlet 120 may be connected to one end of curved microchannel 112 at a connection point C, and outlet 130 may be branched from the other end of curved microchannel 112 at a branch point B. By way of example, inlet 120 may have a shape of a straight passage, and have a length in a range of submillimeters to millimeters. Curved microchannel 112 may have a substantially semicircular or semioval shape. By way of example, FIG. 1B illustrates that an angle between connection point C and branch point B along curved microchannel 112 may be about 180 degree. The angle is not be limited to the illustrated angle, but may be various, as described above. Further, FIG. 1B illustrates that outlet 130 may be bifurcated into first sub-outlet 132 and second sub-outlet 134 at branch point B, and, thus, outlet 130 may be formed of a substantial V-shaped passage. A radius of curved microchannel 112 having the substantially semicircular or semioval shape and a length of outlet 130 may have a range of submillimeters to millimeters, respectively.

In one embodiment, a part of curved microchannel 112 may be a substantially semicircular or semioval shape. By way of example, curved microchannel 112 may have a width or a depth in a range of submillimeters to millimeters. For example, but not limited thereto, the depth or width value is no greater than about 3 mm; about 1 mm; about 0.5 mm; or about 0.1 mm. The length of curved microchannel 112 can be of any dimension. By way of example, the length of curved microchannel 112 may be in the order of inches. For example, but not limited thereto, the length of the microchannels is no more than about 6 inches; about 3 inches; about 1 inch or about 0.5 inch. By way of another example, the lengthwise dimension of curved microchannel 112 may vary or be constant. The cross section of curved microchannel 112 can be any shape, for example, but not limited thereto, rectangular, square, trapezoidal, triangular, circular, or semi-circular.

Microreactor 100 may be manufactured by any known method. In one embodiment, microreactor 100 may be fabricated by performing micromachining technique, such as patterning, photolithography and etching on a substrate such as silicon wafer. By way of example, a substrate, such as silicon wafer, can be coated at both sides thereof with a nitride, and the nitride coated on an upper side of the substrate can be patterned using plasma etching to expose a desired portion (e.g., a portion for reaction channel 110) of the substrate underlying the nitride coating. Then, the exposed portion on the upper side of the substrate can be etched in order to form reaction channel 110. The upper side of the substrate having micromachined may be covered by a proper covering material, such as, not limited thereto, a graphite covering pad, to provide a leak-proof conduit for transporting materials, such as reactant and product, through reaction channel 110.

In one embodiment, at least one reactant may be introduced into inlet 120 of microreactor 100 from a reactant reservoir or tank by using an injection device such as a syringe, a micropipette, or a micropump. Then, the at least one reactant may flow along both outer curved surface 114 and inner curved surface 116, because the reaction does not sufficiently occur yet in curved microchannel 112. After the at least one reactant flows for a certain time in curved microchannel 112, the chemical or biochemical reaction may progress gradually, and, thus, the at least one reactant may generate a product and optionally a byproduct. The at least one reactant, the product and optionally the byproduct may have at least two different phases. In this case, among the at least one reactant, the product and optionally the byproduct, a lighter phase material flows along inner curved surface 116 in curved microchannel 112 so as to be collected from first sub-outlet 132 whereas a heavier phase material flows along outer curved surface 114 in curved microchannel 112 so as to be collected from second sub-outlet 134. The lighter phase material may be flowed into a lighter phase material reservoir or tank which is connected to one end of first sub-outlet 132 while the heavier phase material may be flowed into a heavier phase material reservoir or tank which is connected to one end of second sub-outlet 134.

Figure 2A:
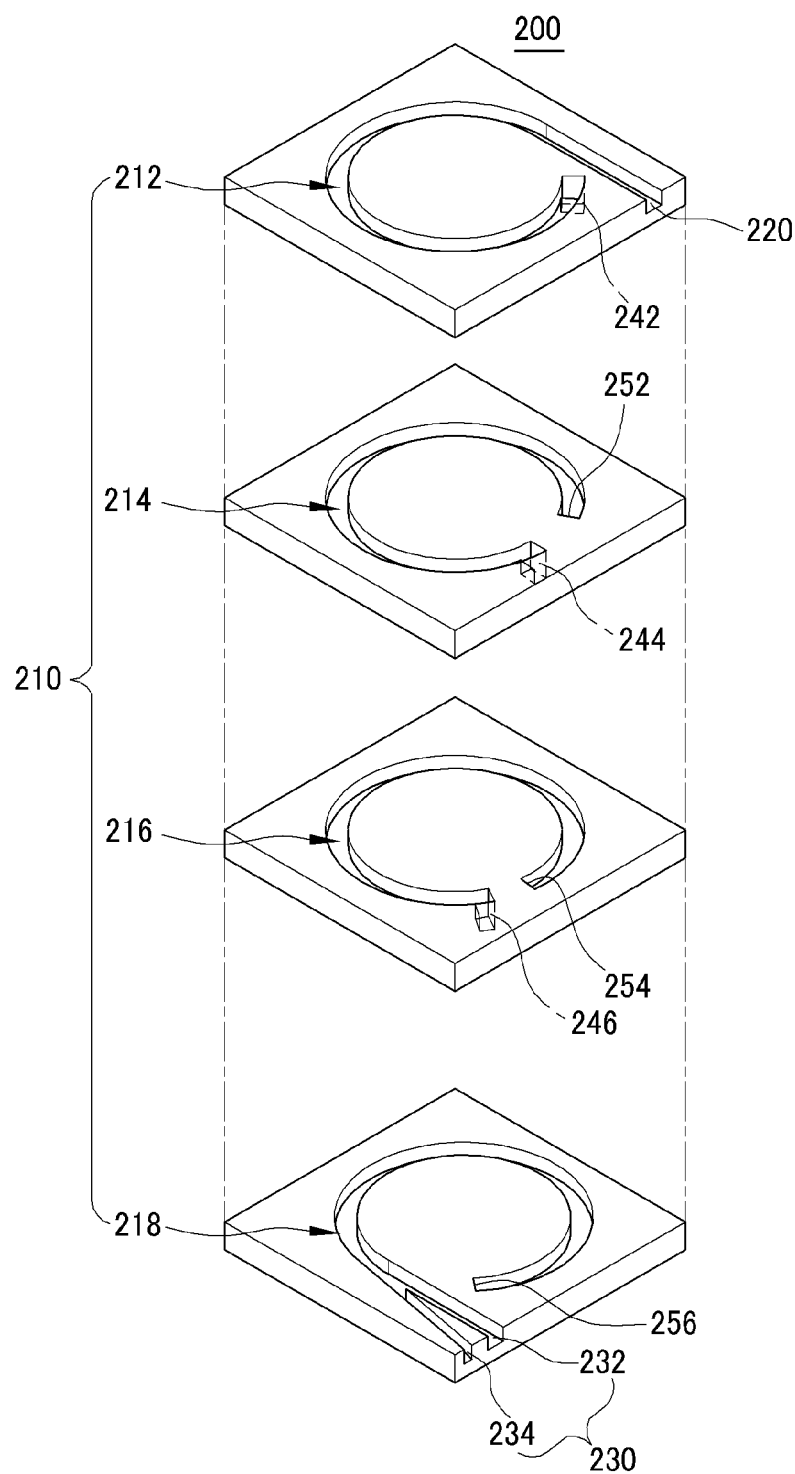
FIG. 2A is a schematic exploded diagram showing another illustrative embodiment of a microreactor.
Figure 2B:
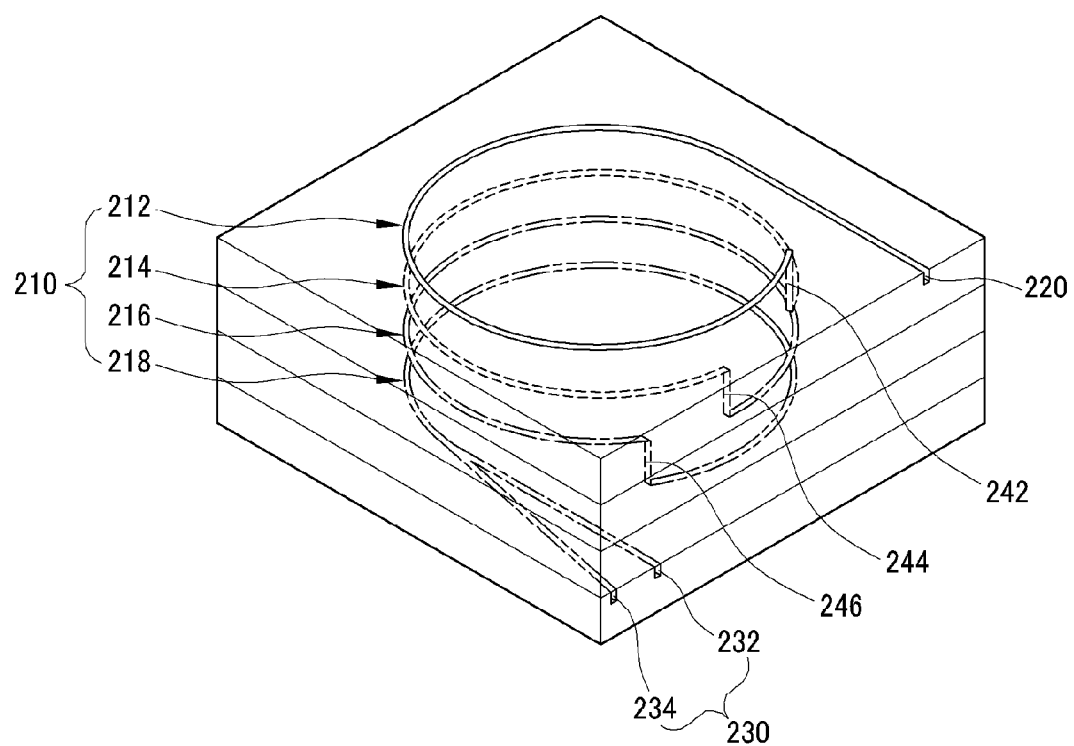
FIG. 2B is a schematic diagram showing the 3-dimensional helical configuration of the microreactor in FIG. 2A.

In some embodiment, at least one solid catalyst particle can be introduced to inlet 120 along with the at least one reactant in order to facilitate the reaction of the at least one reactant. Then, the at least one solid catalyst particle may flow along outer curved surface 114, because the grater centrifugal force is applied to the at least one solid catalyst particle than the at least one reactant in a gas phase, a liquid phase or a gas-liquid mixed phase. Consequently, the at least one solid catalyst particle may be collected from second sub-outlet 134 which is connected to outer curved surface 114, and may be reused. FIG. 2A is a schematic exploded diagram showing another illustrative embodiment of a microreactor. In one embodiment, a microreactor 200 may include four (4) curved microchannels to form a 3-dimensional helical structure. FIG. 2B is a schematic diagram showing the 3-dimensional helical reaction channel of the microreactor in FIG. 2A.

FIGS. 2A and 2B illustrate that microreactor 200 includes a 3-dimensional helical reaction channel 210 having four curved microchannels 212, 214, 216 and 218 interconnected to each other through passage and inlets to sequentially flow reactants into four curved microchannels 212, 214, 216 and 218, and a bifurcated outlet 230 to flow the reactants passing through four curved microchannels 212, 214, 216 and 218 out of reaction channel 210. Each of curved microchannels 212, 214, 216 and 218 may have an outer curved surface and an inner curved surface, as shown in FIG. 1A. Further, each of curved microchannels 212, 214, 216 and 218 may have an inlet 220, 252, 254 and 256 to receive at least one reactant or a product from an outside or an upper microchannel (e.g., 212, 214, 216). Still further, each of curved microchannels 212, 214 and 216 may have passage hole 242, 244, 246 to flow the at least one reactant into a lower microchannel (e.g., 214, 216, 218).

Each of curved microchannels 212, 214, 216 and 218 can be micromachined on a separate substrate such as, but not limited to, silicon, or any micromachinable material. An end of each of curved microchannels 212, 214 and 216 micromachined on each substrate can be etched to form passage holes 242, 244 and 246 which are configured to connect between curved microchannels 212, 214, 216 and 218. The micromachined substrates can be joined together while the curved microchannel on each substrate can be also connected to the other curved microchannel(s) on the other substrates via passage holes 242, 244 and 246. Accordingly, the curved microchannels interconnected with another can be configured to form a 3-dimensional helical reaction channel.

In detail, as depicted in FIGS. 2A and 2B, curved microchannel 212 can be micromachined on a first substrate using standard micromachining technique, such as photolithography and etching, as described above. The first substrate may be further micromachined to form inlet 220 such that inlet 220 contacts one end of curved microchannel 212. The other end of curved microchannel 212 may be etched to form passage hole 242. A second and third substrates may be micromachined to form curved microchannels 214 and 216, and inlets 252 and 254, respectively, and, then, one ends of curved microchannels 214 and 216 may be etched to from passage holes 244 and 246, respectively, using standard micromachining technique, such as photolithography and etching, as described above. A forth substrate may be also micromachined to form curved microchannel 218, inlet 256 and outlet 230, and outlet 230 may be further bifurcated into first outlet 232 and second outlet 234, using standard micromachining technique, such as photolithography and etching. Here, passage hole 242 of curved microchannel 212 may be formed to be in communication with inlet 252 of curved microchannel 214; passage hole 244 of curved microchannel 214 may be formed to be in communication with inlet 254 of curved microchannel 216; and passage hole 246 of curved microchannel 216 may be formed to be in communication with inlet 256 of curved microchannel 218.

Next, the first substrate may be joined with an upper side of the second substrate such that passage hole 242 at one end of curved microchannel 212 on the first substrate may be in communication with inlet 252 of curved microchannel 214 on the second substrate. Then, a lower side of the second substrate may be joined with an upper side of the third substrate such that passage hole 244 at an end of curved microchannel 214 on the second substrate may be in communication with inlet 254 of curved microchannel 216 on the third substrate. Subsequently, a lower side of the third substrate may be joined with an upper side of the forth substrate such that passage hole 246 at an end of curved microchannel 216 on the third substrate may be in communication with inlet 256 of curved microchannel 218 on the forth substrate. The multiple substrates each having micromachined thereon curved microchannel can be gas-tightly joined with each other in order to avoid any leak of materials flowing through curved microchannels 212, 214, 216 and 218. Then, the upper side of f the first substrate having micromachined thereon curved microchannel 212 may be covered with a proper covering material, such as, not limited thereto, a graphite covering pad, configured to provide a leak-proof conduit for a material flowing in curved microchannel 212. Accordingly, four curved microchannels 212, 214, 216 and 218 may be interconnected to form a 3-dimensional helical channel, as depicted in FIG. 2B. It will be apparent to those skilled in the art that the tubing for transporting materials such as reactant and product into and out of the reaction channel can be connected to inlet 220, first outlet 232 and second outlet 234, respectively.

It will be also apparent to those skilled in the art that multiple curved microchannels each micromachined on a separate substrate can be interconnected to form the 3-dimensional helical reaction channel. When materials having at least two different phases flow through a 3-dimensional helical reaction channel having at least two curved microchannels, a lighter phase material in the multiphase materials may flow along an inner curved surface in the curved microchannels while a heavier phase material in the multiphase materials may flow along an outer curved surface in the curved microchannels. A length of a reaction channel becomes longer, the separation efficiency can become better. Accordingly, multiphase materials flowing in a 3-dimensional helical reaction channel having at least two curved microchannels can be efficiently separated into a light phase material and a heavier phase material.

Figure 3:
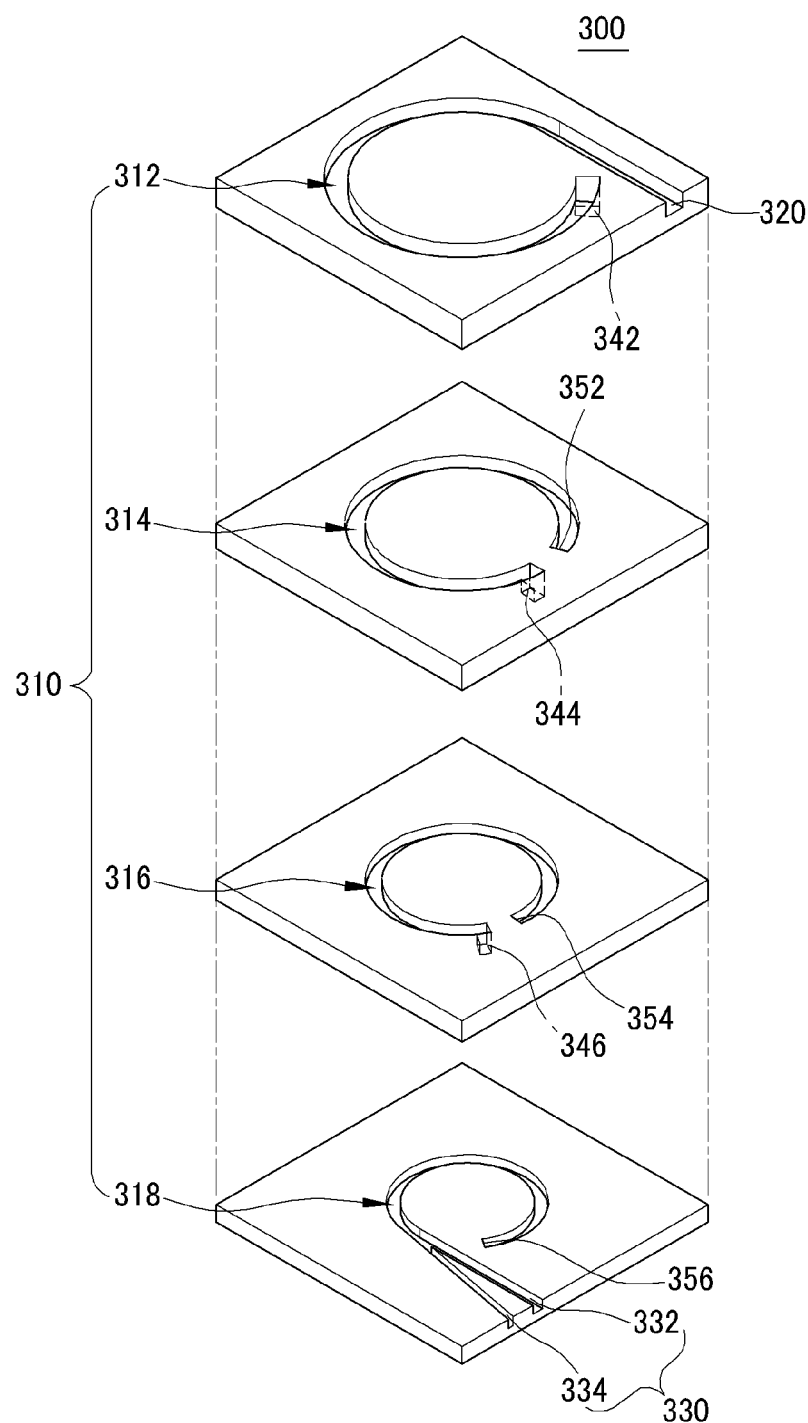
FIG. 3 is a schematic exploded diagram showing still another illustrative embodiment of a microreactor.

FIG. 3 shows a schematic exploded diagram showing another illustrative embodiment of a microreactor. FIG. 3 illustrates that a microreactor 300 includes a reaction channel 310 having four curved microchannels 312, 314, 316 and 318, an inlet 320 to receive at least one reactant from an outside, and a bifurcated outlet 330 to flow the at least one reactant or a product out of reaction channel 310.

Reaction channel 310 may be formed in a substantially similar method to that for reaction channel 210. For example, curved microchannels 312, 314, 316 and 318 may have an outer curved surface and an inner curved surface, respectively, and they may be interconnected through passage holes 342, 344 and 346 and inlets 352, 354 and 356, as described above. Outlet 330 is bifurcated into a first outlet 332 and a second outlet 334. On the contrary to reaction channel 210 in which curved microchannels 212, 214, 216 and 218 has the substantially same radius, reaction channel 310 may be formed to have a smaller radius to form the corn as it goes lower. For example, curved microchannel 314 micromachined on a second substrate has a smaller radius than that of curved microchannel 312 micromachined on a first substrate placed on the second substrate; curved microchannel 316 micromachined on a third substrate has a smaller radius than that of curved microchannel 314 of the second substrate placed on the third substrate; and curved microchannel 318 micromachined on a fourth substrate has a smaller radius than that of curved microchannel 316 micromachined on the third substrate placed on the fourth substrate. Accordingly, the first to fourth substrates each having micromachined thereon curved microchannels, respectively, with decreasing radius can be configured to form a cyclone-type reaction channel as depicted in FIG. 3.

When materials having at least two different phases flow through a cyclone-type reaction channel having at least two curved microchannels with decreasing curvatures, a lighter phase material flows along an inner curved surface in the curved microchannels while a heavier phase material flows along an outer curved surface in the curved microchannels. A length of a reaction channel becomes longer, the separation efficiency becomes better. Accordingly, multiphase materials flowing in a cyclone-type reaction channel having at least two curved microchannels can be efficiently separated into a light phase material and a heavier phase material.

Figure 4A:
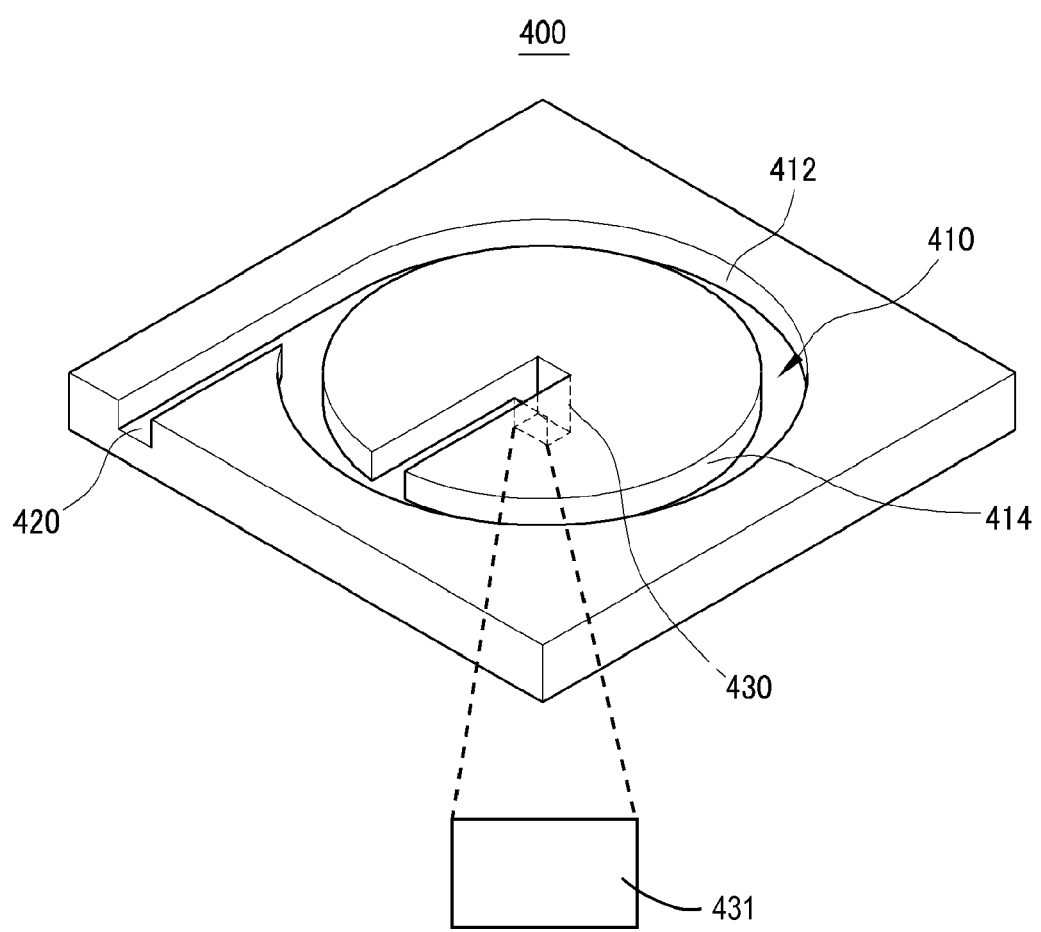
FIG. 4A is a schematic diagram of still further another illustrative embodiment of a microreactor.
Figure 4B:
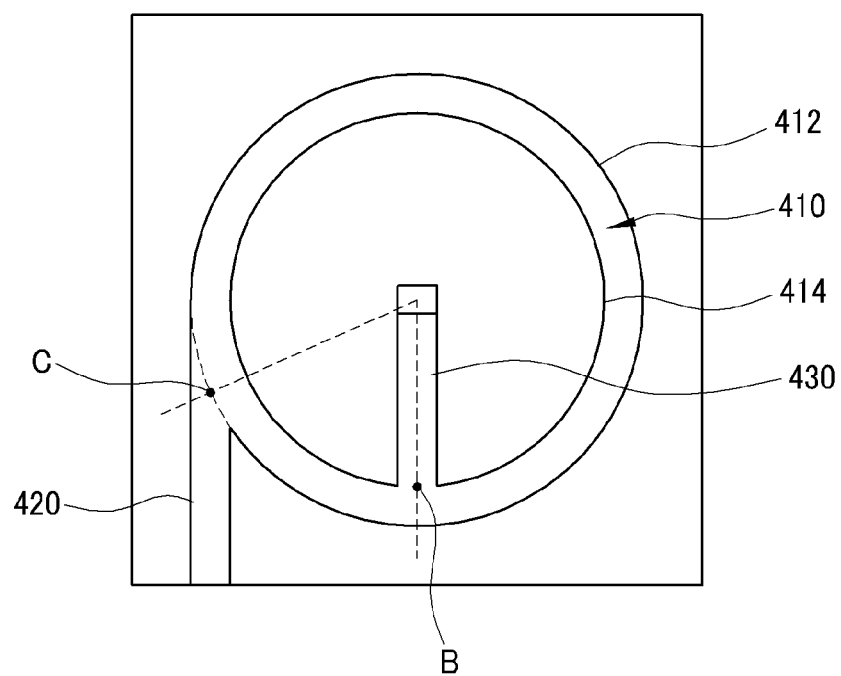
FIG. 4B is a plane view of the microreactor in FIG. 4A.

FIG. 4A is a schematic diagram of still further another illustrative embodiment of a microreactor and FIG. 4B is a plane view of the microreactor in FIG. 4A. FIGS. 4A and 4B illustrate that a microreactor 400 includes a substantially circular reaction microchannel 410, an inlet 420, and an outlet 430. Substantially circular reaction microchannel 410 may have an outer circular wall 412 and an inner circular wall 414. As shown in FIG. 4B, inlet 420 may be tangentially connected to outer circular wall 412 at a connection point C, and outlet 430 may be protruded from inner circular wall 414 at a branch point B toward the center of substantially circular reaction microchannel 410. As used herein, "tangentially" means that inlet 420 is connected to substantially circular reaction microchannel 410 such that the at least one reactant and/or the at least one solid catalyst particle can be flowed into or introduced into the substantially circular reaction microchannel 410 without a high resistance to the flow at connection point C, as shown in FIG. 4B.

Substantially circular reaction microchannel 410, inlet 420 connected to outer circular wall 412 of substantially circular reaction microchannel 410, and outlet 430 protruded from inner circular wall 414 of substantially circular reaction microchannel 410, can be micromachined on a substrate using standard micromachining technique, such as photolithography and etching, as described for microreactors 100, 200 and 300. An end of outlet 430 is etched into the substrate to be configured to exit a material such, as a reactant and product in a gas phase, liquid phase or gas-liquid mixed phase other than catalyst particles. Then, an upper side of the substrate is covered with a proper covering material such as, not limited thereto, a graphite covering pad, configured to provide a leak-proof conduit for a material flowing through substantially circular reaction microchannel 410. The tubing for transporting materials such as reactant and product into and out of the reaction channel can be connected to inlet 420 and outlet 430, respectively.

In FIG. 4A, at least one catalyst solid particle flows along an outer circular surface in substantially circular reaction microchannel 410 and remains to be continuously circulated in substantially circular reaction microchannel 410 for a catalytic reaction. A material in a gas phase, liquid phase or gas-liquid mixed phases other than the at least one catalyst solid particle flows along an inner circular surface in substantially circular reaction microchannel 410 to be removed from microreactor 400 through outlet 430.

In one embodiment, the at least one catalyst solid particle and the at least one reactant may be introduced into inlet 420 together or separately, and moved into substantially circular reaction microchannel 410. As the catalytic reaction may progress in substantially circular reaction microchannel 410, the at least one reactant generates a product and optionally a byproduct. Although the at least one catalyst solid particle has a solid phase, the at least one reactant, the product, and optionally the byproduct have any one of a gas phase, a liquid phase and a gas-liquid mixed phase, respectively. Accordingly, the at least one catalyst solid particle flows along outer circular wall 412 of substantially circular reaction microchannel 410, whereas the at least one reactant, the product, and optionally the byproduct flow along inner circular wall 414 of substantially circular reaction microchannel 410. This is because the at least one catalyst solid particle is subjected to a relatively greater centrifugal force than the at least one reactant, the product, and optionally the byproduct, and is forced to go away from the center of substantially circular reaction microchannel 410. Because outlet 430 is protruded from inner circular wall 414 of substantially circular reaction microchannel 410, the at least one catalyst solid particle, which flows along outer circular wall 412, remains to be continuously circulated along outer circular wall 412 of substantially circular reaction microchannel 410. However, the at least one reactant, the product, and optionally the byproduct are flowed into outlet 430 and collected in a reservoir or tank 431.

In some embodiments, the at least one catalyst solid particle may be suspended in the substantially circular reaction microchannel of a microreactor. In other embodiments, the at least one catalyst solid particle may be fluidized in the substantially circular reaction microchannel of a microreactor. It will be apparent to those skilled in the art that the microreactor can be used for any catalytic reactions using at least one catalyst solid particle.

By way of example, the at least one catalyst solid particle may be loaded into a microreactor by introducing a suspension of catalyst particles into the inlet connected to the substantially circular reaction microchannel of the microreactor or a catalyst introduction port communicating with the inlet under pressure while drawing vacuum at the outlet protruded from an inner circular wall of the substantially circular reaction microchannel of the microreactor until the substantially circular reaction microchannel is packed with the at least one catalyst solid particle. It will be apparent to those skilled in the art that any other methods for loading at least one catalyst solid particle into a microreactor can be also applied.

In some embodiments, the microreactor may further include a filtering device, positioned at branch point B, configured to prevent the at least one catalyst solid particle from flowing into the outlet. By way of example, the filtering device may be such as, not limited thereto, a meshed filter or a baffle, as shown in FIG. 4C and FIG. 4D.

Figure 4C:
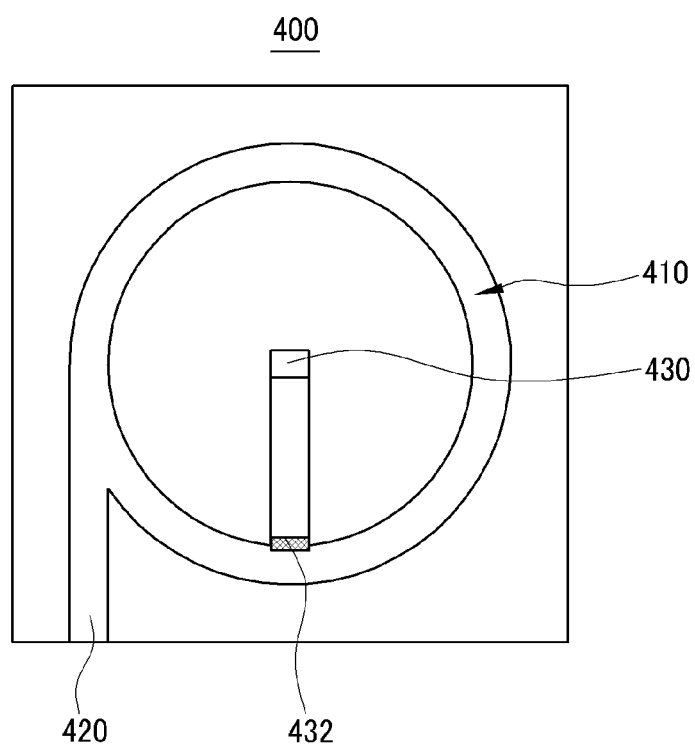
FIG. 4C is a schematic diagram of the microreactor in FIG. 4A including a meshed filter.

FIG. 4C is a schematic diagram of microreactor 400 further including a meshed filter 432 positioned at a junction area (for example, branch point B shown in FIG. 4B) between outlet 430 and the inner circular wall of substantially circular reaction microchannel 410. Meshed filter 432 can be configured to prevent the at least one catalyst solid particle from flowing into outlet 430. In detail, the at least one catalyst solid particle may flow along the outer circular surface in substantially circular reaction microchannel 410 whereas a material in a gas phase, liquid phase or gas-liquid mixed phases other than the at least one catalyst solid particle flows along an inner circular surface in substantially circular reaction microchannel 410. The at least one catalyst solid particle can be prevented from flowing into outlet 430 by meshed filter 432 to remain in substantially circular reaction microchannel 410. Accordingly, the at least one catalyst solid particle remains in substantially circular reaction microchannel 410 to be continuously circulated therethrough during a catalytic reaction, whereas a material other than the at least one catalyst solid particle can be removed from substantially circular reaction microchannel 410 through outlet 430.

Figure 4D:
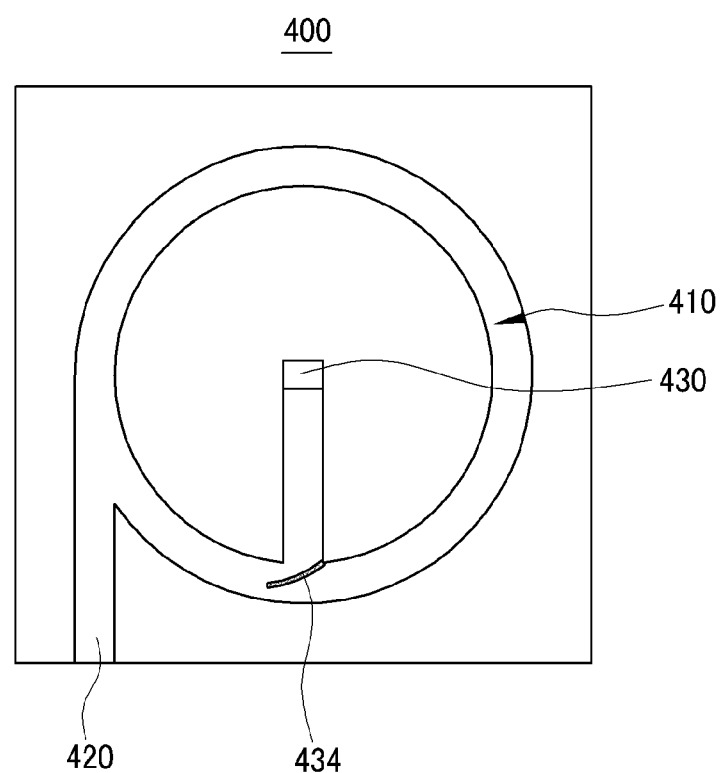
FIG. 4D is a schematic diagram of the microreactor in FIG. 4A including a baffle.

FIG. 4D is a schematic diagram of microreactor 400 further including a baffle 434 positioned at a junction area between outlet 430 and the inner circular wall of substantially circular reaction microchannel 410. Baffle 434 also can be configured to prevent the at least one catalyst solid particle from flowing into outlet 430. A baffle is generally a plate or mechanical device designed to restrain or regulate the flow of a fluid or the emission of light or sound. In detail, the at least one catalyst solid flows along an outer circular surface in substantially circular reaction microchannel 410 whereas a material in a gas phase, liquid phase or gas-liquid mixed phases other than the at least one catalyst solid particle flows along an inner circular surface in substantially circular reaction microchannel 410. The at least one catalyst solid particle remains in substantially circular reaction microchannel 410 to be continuously circulated therethrough for a catalytic reaction, whereas the fluid material in a gas phase, liquid phase or gas-liquid mixed phases other than the at least one catalyst solid particle can be removed from microreactor 400 through outlet 430 protruded from an inner circular wall of substantially circular reaction microchannel 410.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or, "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a second third, middle third and first third, etc. As will also be understood by one skilled in the art all language such as "up to," "at least", and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A microreactor comprising:
    a substantially circular reaction microchannel having an outer and inner curved surfaces and being configured to generate a centrifugal force;
    an inlet configured to supply at least one solid catalyst particle and at least one reactant into the substantially circular reaction microchannel, wherein the inlet is tangentially connected to the outer curved surface of the substantially circular reaction microchannel; and
    an outlet in communication with the inner curved surface of the substantially circular reaction microchannel.

2. The microreactor of claim 1, wherein the outlet is protruded from the inner curved surface of the substantially circular reaction microchannel.

3. The microreactor of claim 1, wherein the at least one reactant has any one of a gas phase, a liquid phase and a gas-liquid mixed phase.

4. The microreactor of claim 3, wherein the substantially circular reaction microchannel is configured to flow the at least one solid catalyst particle along the outer curved surface thereof and to flow the at least one reactant along the inner curved surface thereof.

5. The microreactor of claim 1, wherein the outlet is protruded from the inner curved surface of the substantially circular reaction microchannel at a position distanced away from the inlet such that the at least one reactant is substantially transformed into a product by contact with the at least one solid catalyst particle in the microchannel.

6. The microreactor of claim 1, further comprising:
    a filtering device configured to prevent the at least one solid catalyst particle from flowing into the outlet.

7. The microreactor of claim 6, wherein the filtering device is a meshed filter or a baffle.

8. The microreactor of claim 1, wherein the substantially circular reaction microchannel is configured to circulate the at least one solid catalyst particle along the outer curved surface thereof.

9. The microreactor of claim 6, wherein the filtering device is positioned at a junction area between the outlet and the inner curved surface.

10. The microreactor of claim 1, wherein the outlet is protruded toward the center of the microreactor.

11. The microreactor of claim 6, wherein the filtering device is a baffle.

12. A microreactor system comprising:
    a substantially circular reaction microchannel having an outer and inner curved surfaces and being configured to generate a centrifugal force;
    an inlet configured to supply at least one solid catalyst particle and at least one reactant into the substantially circular reaction microchannel, wherein the inlet is tangentially connected to the outer curved surface of the substantially circular reaction microchannel;
    an outlet in communication with the inner curved surface of the substantially circular reaction microchannel; and
    a reservoir in communication with the outlet and configured to receive the at least one reactant or a product produced by the solid catalyst particle and the reactant,
    wherein the substantially circular reaction microchannel is configured to flow the at least one solid catalyst particle along the outer curved surface thereof and to flow the at least one reactant along the inner curved surface thereof.

13. The microreactor system of claim 12, wherein the outlet is protruded from the inner curved surface of the substantially circular reaction microchannel.

14. The microreactor system of claim 12, wherein the at least one reactant has any one of a gas phase, a liquid phase and a gas-liquid mixed phase.

15. The microreactor system of claim 12, wherein the outlet is protruded from the inner curved surface of the substantially circular reaction microchannel at a position distanced away from the inlet such that the at least one reactant is substantially transformed into a product by contact with the at least one solid catalyst particle in the microchannel.

16. The microreactor system of claim 12, further comprising:
 a filtering device configured to prevent the at least one solid catalyst particle from flowing into the outlet.

17. The microreactor system of claim 16, wherein the filtering device is a meshed filter.

18. The microreactor system of claim 16, wherein the filtering device is a baffle.

19. The microreactor system of claim 16, wherein the filtering device is positioned at a junction area between the outlet and the inner curved surface.

20. The microreactor system of claim 12, wherein the outlet is protruded toward the center of the microreactor.

* * * * *

UNITED STATES PATENT AND TRADEMARK OFFICE
CERTIFICATE OF CORRECTION

| | | |
|---|---|---|
| PATENT NO. | : 8,187,553 B2 | Page 1 of 1 |
| APPLICATION NO. | : 12/766349 | |
| DATED | : May 29, 2012 | |
| INVENTOR(S) | : Lee | |

It is certified that error appears in the above-identified patent and that said Letters Patent is hereby corrected as shown below:

On the Face Page, in Field (56), under "OTHER PUBLICATIONS", in Column 2, Line 3, delete "microreators" and insert -- microreactors --, therefor.

In Column 4, Lines 20-21, delete "Galvanoforming Abforming)" and insert -- Galvanoformung Abformung) --, therefor.

In Column 15, Line 22, delete "or," and insert -- or --, therefor.

In Column 16, Line 23, in Claim 7, delete "filter or a baffle." and insert -- filter. --, therefor.

Signed and Sealed this
Fourteenth Day of August, 2012

David J. Kappos
*Director of the United States Patent and Trademark Office*